United States Patent [19]
Choate et al.

[11] 3,721,269
[45] March 20, 1973

[54] ORIENTED POLYBUTENE-1 TUBING

[75] Inventors: Luther J. Choate, Baytown; Gaylon T. Click, Pearland, both of Tex.

[73] Assignee: Petro-Tex Chemical Corporation, Houston, Tex.

[22] Filed: Nov. 23, 1970

[21] Appl. No.: 91,932

[52] U.S. Cl. ............... 138/119, 161/139, 161/165, 161/247, 161/402, 264/95
[51] Int. Cl. ........ B23b 27/00, F16l 11/04, F16l 11/12
[58] Field of Search ...... 161/139, 165, 149, 247, 402, 161/411; 264/95, 209, 210; 138/118, 119

[56] References Cited

UNITED STATES PATENTS

| | | | |
|---|---|---|---|
| 3,576,051 | 4/1971 | Click | 264/95 |
| 3,234,312 | 2/1966 | Jordan | 264/210 R |
| 3,385,817 | 5/1968 | Jones | 260/93.7 |
| 3,508,587 | 4/1970 | Mauch | 138/119 |
| 2,643,027 | 6/1953 | Fink | 138/119 |
| 3,532,366 | 10/1970 | Rakus et al. | 264/230 |
| 3,167,814 | 2/1965 | Corbett | 264/210 R |
| 3,551,540 | 12/1970 | Pellicciari et al. | 264/210 R |
| 3,300,555 | 1/1967 | Bild et al. | 264/210 R |

*Primary Examiner*—Robert F. Burnett
*Assistant Examiner*—George W. Moxon, II
*Attorney*—G. Baxter Dunaway

[57] ABSTRACT

Oriented polybutene-1 flexible, collapsible tubing having the highest degree of tear strength is obtained by maintaining the ratio of machine direction orientation to transverse direction orientation in the range of about 0.7 to 0.9. Unexpectedly this ratio rather than a ratio of 1.0 which represents a balanced film gives the best tear strengths because of the crease lines formed in the tubing during production. The crease lines have a tear strength that totally disrupts the expectable and predictable tear properties of the tubing.

2 Claims, 3 Drawing Figures

PATENTED MAR 20 1973　　　3,721,269

Luther J. Choate
Gaylon T. Click
　　　INVENTORS

BY Kenneth H. Johnson

ATTORNEY

ORIENTED POLYBUTENE-1 TUBING

The present invention relates to oriented polybutene tubing.

Thin walled polybutene-1 tubing has been proposed for use as the means of transporting water in agricultural irrigation systems. Although open ditches are by far the most common means of transporting water in irrigation systems, both here and abroad, the threat of serious water shortages in many areas requires that a more effective and efficient system for irrigating agricultural areas be used. The loss of water, for example, from open ditch irrigation by air evaporation and ground seepage, is estimated to be from about 35 to 50 percent, and in certain areas even higher. In addition open ditches in many instances can become potential health hazards by providing a convenient breeding place for insects. Open ditches further require, if either flooding or excessive dryness if to be avoided, constant-maintenance to insure an even distribution of irrigation water.

The use of metal pipes, such as iron or aluminum, for transporting water is effective in reducing water loss by evaporation. However, its use is generally limited by the great expense entailed in laying and maintaining metal pipe. Aluminum pipe, for example, requires the assistance of trained personnel to lay and care for the pipe, while iron pipe requires year-round maintenance to prevent excessive corrosion. The difficulty of storing and moving metal pipe, as well as the expense of the initial purchase thereof, has limited its general use in irrigation systems.

The use of polyethylene or polyvinyl chloride as a substitute for aluminum or iron piping has found limited success because of the polymers' low burst strength, short life, and poor resistance to creep. In order to strengthen the walls of the polymerized pipe, thicker tubular walls had to be constructed or the tubular members had to be reinforced with other materials such as nylon, fiberglass, metals, and the like. Laminated polymeric layers have also been suggested as a means for strengthening the tubular walls. These reinforcing or strengthening techniques added substantially to the initial cost of manufacture, making its use uneconomical for general irrigation purposes.

Polybutene-1 tubing provides a flexible and collapsible system which can be easily and readily stored or moved to new locations as the need arises. The polybutene-1 tubing employed is oriented both in the machine direction and in the transverse direction. Orientation of the tubing in both directions provides the strength necessary for transporting fluids such as water under relatively high pressure. A balanced oriented film is one which has the same degree of orientation in both directions. Normally a balanced oriented film will have substantially the same tear strength along either axis. However in the preparation of polybutene-1 tubing there is a crease line produced. The crease line results as the oriented film is collapsed and rolled on a takeup roll. The crease line adds an inherent weakness, that is, an additional factor to the polybutene-1 tubing which disrupts the predictability regarding the nature of the tubing based on relative degrees of orientation in both directions. It would be expected that polybutene-1 tubing having balanced orientation would represent an optimum strength tubing, however, this is not the case. It has been found that balanced oriented polybutene-1 tubing has inferior tear strength at the crease.

One of the objects of the present invention is to provide a polybutene-1 tubing having maximized tear strength in regard to each of machine orientation, transverse orientation and crease line. Another object of the invention is to provide the means of obtaining polybutene-1 tubing having maximized tear strength in regard to machine and transverse orientation and crease. These and other objects will become clear from the following description of the invention. Briefly stated, the present invention is flexible, collapsible tubing comprising oriented polybutene-1 having two creases in the machine direction and a ratio of machine direction orientation to transverse direction orientation in the range of about 0.7 to 0.9.

Polybutene-1 is extruded into blown film using conventional film blowing equipment by feeding pellets of polybutene polymer from a hopper into a heated extruder. The polybutene polymer in the form of pellets enters the extruder where it is melted and under pressure is forced around and out a mandrel located inside the die. The polymer is shaped into a sleeve and extracted through the ring shaped die opening in the form of a rather thick tube. The tube which is in the melt stage is expanded to a "bubble" of desired diameter and corresponding lower film thickness. This expansion is accomplished by the pressure of internal air admitted through the center of the mandrel. The blown up bubble is closed by the die at one end and by the pinch rolls (also called nip or squeeze rolls) at the other end of the bubble. Inside the bubble, the air is maintained at a constant pressure to insure uniform film width and film gauge. The gauge of the film is also affected by the extruder output, take-off speed, temperature of the barrel and die, quantity of air, and the width of the die.

The temperature of the barrel of the die extruding the film is generally maintained at a temperature as low as practically possible. Normally, temperatures in the range of 280°F. to 330°F. are used. Temperatures as high as 400°F. or even higher can be used if adequate film cooling is provided.

Haul-off speeds can range widely depending on film width, film thickness and extruder capacity. Usually, a faster haul-off rate for the same film dimensions requires a larger volume of cooling air which is to be applied to the film shortly after it leaves the die lip. Usually, thinner gauge film may be extruded at a much more rapid rate due to the ability of the thinner film to cool much more rapidly. Thicknesses of about 10 to 30 mils, which is the thickness usually used for irrigation tubing, are normally extruded at rates in excess of 50 feet per minute.

The rate of cooling the bubble is critical for allowing highest film quality and averting blocking in the pinch rolls and on the wind-up roll. On most blown tubing extruders, baffle air rings of various designs are used to project streams of cooler air or room temperature air against the film all around the bubble as it leaves the die. Generally, a large volume of low pressure air if preferred to smaller volumes of air directed under a high pressure. Controlling quality and direction of air is important if uniform gauge film is to be obtained.

The ratio of the die diameter to that of the blown bubble is one of the most important extruder variables. A blow-up ratio can be varied from less than 1:1 to about 6:1. However, blow-up ratios of between 1.0 to 1 to 2.25 to 1 are preferred.

As previously noted, the blown film is collapsed by guide rolls to a point where the film can be pinched and subsequently rolled on a spool as a sheet of flattened tubing.

A comprehensive general description of film blowing can be found in a U.S. Industrial Chemicals Company publication entitled "Petrothene Polyethylene A Processing Guide," copyright 1958 by U.S. Chemicals Company, a division of National Distillers and Chemical Corporation.

The flexible and collapsible polybutene tubular member produced by the polymerization and extruding techniques above described may possess a broad range of tubular diameters and wall thicknesses. Generally, though, the tubular member when used specifically as irrigation tubing, will possess a wall thickness of from about 10 to 30 mils and a tubular diameter of from about 4 to 15 inches. Various modifications of the above dimensions are permissible as long as the characteristics of flexibility and collapsibility are not jeopardized. However, for most irrigation systems the polybutene tube will preferably possess a wall thickness of between 15 and 20 mils and a diameter of between 4 and 13 inches.

The ratio of machine direction orientation to transverse direction orientation can be varied (or maintained) by varying the die opening, the blow-up ratio or the thickness of the film (tube) produced individually or in varying combinations as taught by the equation $M/T = do/(BU)^2 t$ where $M =$ machine direction orientation, $T =$ transverse direction orientation, $d =$ die opening, $BU =$ blow-up ratio and $t =$ film thickness.

The term machine direction is used to indicate the long axis of the tubing and refers to the direction in which the extruding and tube making apparatus moves the tubing. The term "transverse direction" refers to a direction along an axis perpendicular to the axis of the machine direction The equation for orientation was derived from mass flow calculation. The mass flow for the polymer leaving the die is $$Q_o = V_o \pi (r_2^2 - R_1^2) P_0$$

where
$Q_o =$ Mass flow of polymer
$V_o =$ Velocity of polymer past die opening
$r_2 =$ Outside radius of die
$r_1 =$ Inside radius of die
$P_o =$ Melt density
The mass flow for the bubble is $$Q_1 = V_1 \pi (R_2^2 - R_1^2) P_1$$

where,
$Q_1 =$ Mass flow of bubble
$V_1 =$ Velocity of bubble during take-up
$R_2 =$ Outside radius of bubble
$R_1 =$ Inside radius of bubble
$P_1 =$ Polymer density of polymer in forming area
The mass flow from the die must equal the mass flow overhead, therefore, $$Q_o = Q_1 \text{ and } V_1 \pi (R_2^2 - R_1^2) P_1 = V_o \pi (r_2^2 - r_1^2) P_0,$$

therefore, $$V_1 (R_2^2 - R_1^2) = (P_0/P_1) V_0 (r_2^2 - r_1^2)$$

$$R_1 = R_2 - t, \text{ and } r_1 = r_2 - (do)$$

where $t =$ Film thickness
$do =$ Die opening
therefore, $$\frac{V_1}{V_0} = \frac{P_0}{P_1} \frac{[r_2^2 - r_2^2 + 2r_2(do) - (do)^2]}{[R_2^2 - R_2^2 + 2R_2 t - t^2]} = \frac{P_0}{P_1} \frac{[d_2(do) - (do)^2]}{D_2 t - t^2}$$

where
$d_2 =$ Outside diameter of die
$D_2 =$ Outside diameter of bubble
For thin film and small die opening, as usually employed in regard to the present invention, the power terms can be neglected, resulting in the equation:
$V_1/V_0 = K[d_2 (do)/D_2 t] = K[do/(BU) t]$
where,
$K = P_0/P_1 =$ Constant
$BU = D_2/d_2 =$ Blow-up ratio
If the frost line is above the forming area, then
$K = 1$
and,
$V_1/V_0 = do/(BU) t$
The term $V_1/V_0$ is the machine direction orientation and the blow-up ratio ($B.U.$) is the transverse orientation, therefore,
$M/T = do/(BU)^2 t$
where,
$M =$ Machine direction orientation
$T =$ Transverse direction orientation FIG. 1 shows a cross section of a collapsed polybutene-1 tubing produced as described above. 1 is the contact line of the sides of the collapsed tube and 2 is the crease.

Figure 1:
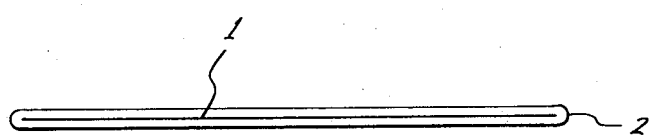
Figure 2:
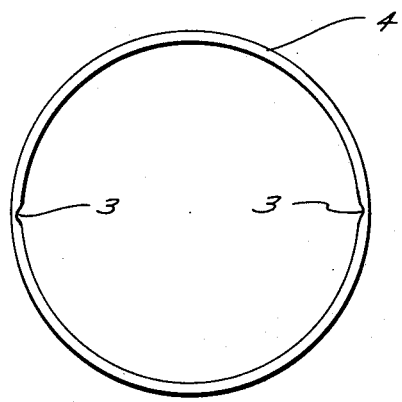
FIG. 2 shows in somewhat exaggerated form the crease line, 3 remaining in the inflated polybutene-1 tubing 4.

It can be seen from the graph that crease tear strength declines at a faster rate than the machine direction tear strength. By maintaining the ratio of $M/T$ in the range of 0.7 to 0.9 a tubing having the best balance of tear strengths is obtained.

The preferred polybutene-1 polymer used in this invention may be further characterized as containing more than 50 percent ether insolubles having a density within the range of about 0.88 to about 0.92 (grams/cc. at 25° C.) (ASTM D 1238–57T), a melt index of from about 0.1 to about 5 (ASTM D 1238–57T), a yield strength of from about 1,100 or 1,800 to about 3,200 p.s.i. (ASTM D 638–58T modified), and a tensile strength of between about 3,000 p.s.i. to about 6,000 p.s.i. (ASTM D 638–58T modified). The melt index of such polymer at 190° F. is generally between 0.2 to 2.0 (ASTM D 1238–57T) with a Shore D hardness of between about 52 or 60 and 73 (ASTM D–1706–59T) and an elongation of at least 200 percent and preferably between 200 and 400 percent (ASTM D 638–58T modified).

The preferred polybutene-1 polymers, in addition, possess a film impact strength of between 150 and 500 $F_{50}$ grams (ASTM D 1709–62T). The preferred polymers may also have a low temperature brittleness above about −15°C. (ASTM D 746–57T) but more preferred are polymers having a low temperature brittleness of about −15°C. or lower.

The polybutene polymer for use in this invention can be obtained by utilizing a variety of polymerization catalysts. Generally, the polymerization is conducted in the presence of a Ziegler type polymerization catalyst comprising a transitional metal compound such as a metal halide and a reducing component consisting normally of a metal alkyl compound.

Representative of the transitional metal compounds which may be used include those selected from Groups IVB, VB and VIB of the Periodic Table.* (*Periodic Table as shown on pages 448 and 449, Handbook of Chemistry and Physics, 43rd edition, Chemical Rubber Publishing Company. 1961–1962.) Included in the preferred species are the halides of metals selected from the Groups consisting of Groups IVB, VB and VIB of the Periodic Table and particularly the titanium halides, such as titanium tetrachloride, titanium trichloride, and titanium dichloride, and mixtures thereof. Other metal compounds, such as zirconium tetrahalide, hafnium tetrachloride, vanadium chloride, chromium chloride, tungsten chloride, and the like, are also useful. Still other transitional metal halides containing halogens selected from the group consisting of bromine, iodine, chlorine, and in certain instances, fluoride can also be used.

The reducing component of the Ziegler catalyst composition may be any of a variety of reducing agents. Most common among the reducing agents are organometallic compounds such as triethyl aluminum, diethyl aluminum chloride, aluminum sesquichloride, diethyl aluminum hydride, aluminum triisobutyl, aluminum trisopropyl, and related compounds. Many other reducing agents, such as lithium aluminum hydride, ethyl zinc hydride, and the like, are described in the literature as useful reducing agents and can also be used. These catalysts are of the now well-known "-Ziegler" variety. Organometallic compounds such as the aluminum alkyl compounds selected from the group consisting of triethyl aluminum, diethyl aluminum chloride, aluminum sesquichloride and aluminum ethyl dichloride are particularly useful.

In the catalytic complex comprising a transitional metal compound and a reducing component, the ratio of constituents may be varied over a relatively broad range. The preferred range depends to a large extent on the operating conditions, the choice of catalytic ingredients, and the grade of polymer desired. Broadly speaking, though, where the transitional metal compound is a titanium halide and the reducing component is an aluminum alkyl compound, the ratio of the aluminum compound may be varied from about 0.5 to 5 mols or even 10 mols of aluminum compound per mol of titanium halide. However, preferably, the reducing component is normally present in excess of the transitional metal compound.

In using the above catalyst, a number of procedures may be employed. For example, the catalyst complex may be pre-formed and preactivated prior to combining the complex with the hydrocarbon feed. In another technique, the catalyst may be combined in an inert solvent and this slurry added to or combined with the hydrocarbon feed. In some instances, the catalyst components may be added directly to the hydrocarbon feed. While the catalyst may be prepared over a wide range of temperatures, the catalyst is usually prepared at a temperature of between 30°C. and 150°C. The amount of catalyst used may be varied quite widely and may be as low as 0.01 weight percent based on the weight of the butene being polymerized. Generally, though, catalytic quantities in an amount of between 0.01 to about 10 weight percent are employed. The polymerization reaction is normally conducted at temperatures of between 0°C. and 150°C. and at about 1 to 50 atmospheres.

The polymeric reactions may be conducted in bulk or in an inert diluent having three to 10 carbon atoms. Preferred are the inert liquid hydrocarbons, such as propane, butane, pentane, heptane, and the like; however, such materials as isooctane, cyclohexane, benzene, toluene, and the like are also useful. If desired, the polymerization can be conducted in the absence of a diluent, i.e., in the presence of only butene. The polymer formed by the above described processes may then be solidified in free flowing particulate form with a high bulk density after stopping the polymerization by deactivating the catalyst as with an alcohol.

In a preferred polymerization, the polymer is produced by conducting the polymerization in a liquid reaction mixture with a catalyst which is a complex or reaction product of an alkyl metal compound, such as diethyl aluminum chloride or aluminum sesquichloride (an equal molar mixture of aluminum diethyl chloride and aluminum ethyl dichloride) with a compound of titanium, e.g., titanium tetrachloride, titanium trichloride-aluminum complex or aluminum activated titanium trichloride. The temperature to be used in carrying out the polymerization is generally between about 25°C. to 35°C. with a pressure of between 100 and 300 p.s.i.g. The reaction mixture comprises a liquid composition consisting essentially of butene-1. However, liquid compositions wherein the butene-1 constitutes at least 90 percent by weight or between 95 or 99 percent by weight of the total reaction mixture may be used.

Although any desired method of contacting the butene with the catalyst may be used, a preferred method is to pass the olefin as a gas or vapor or even as a liquid into the catalyst slurry with good agitation. Polymerization occurs and continues at a rate which varies somewhat according to the nature of the polymerization feed, the catalyst, the relative concentrations of both the feed and catalyst in respect to the amount of diluent present.

In preparing the catalyst, a preferred procedure is to make a solution of aluminum sesquichloride in a suitable solvent, such as n-heptane, and to make a separate solution of titanium tetrachloride, also in an inert solvent such as n-heptane, and then mix the two solutions in the desired proportions at room temperature. The mixture of these two catalyst components generally causes the formation of a precipitate which is desirably kept in suspension by agitation. Normally, the mol ratio of the aluminum compound to the titanium compound of the catalyst mixture is generally about 3 mols of aluminum per mol of titanium. However, various modifications of the titanium to sesquichloride ratio may also be used if desired.

A further discussion on the polymerization system and the catalysts used therefor can be found in the Ziegler et al. U.S. Pat. No. 3,113,115, issued or Dec. 3, 1963, and in the Seelbach et al. U.S. Pat. No. 2,964,510 issued on Dec. 13, 1960.

If desired, the improved polybutene irrigation tubing may also contain various stabilizing additives, as well as additives for improving the polymer's resistance to ultraviolet rays, such as carbon black. The amount of carbon black employed with the polybutene polymer may be varied from about 1.0 to 5.0 weight parts of carbon black per 100 weight parts of polybutene polymer. Generally, though, the amount of carbon black employed will be between about 2.5 to about 3.0 weight parts of polymer. In some instances, though, the carbon black may be as high as 50 weight parts per 100 weight parts of polymer.

The carbon black may be combined with the polymer by any of the methods well known in the art, as by mixing or blending on a mill, in an internal mixer, and the like.

The following example will further demonstrate the invention.

EXAMPLE

Pellets of polybutene-1 were screw-forced into a heated die where the polymer was melted and forced through a die having die lip opening of about 0.035 inch. The die temperature was approximately 400°F. and the polymer was extruded through the die at a pressure of 2,000 p.s.i. The polymer is extruded as a thick tube. While the tube was in the melt state, it was expanded by introducing air into the center of the tube though the die to form a bubble. By adjusting the diameter of the bubble relative to the diameter of the extruded thick tube it is possible to vary the blow-up ratio (BU) and hence the $M/T$ by the equation $M/T = do/(BU)K2T$. The bubble was cooled by blowing air at the point of extrusion, the air being maintained at room temperature. The bubble was collapsed in size by guide rollers and collapsed to a tubular sheet by pinch rollers.

A representative sample of the pelletized polybutene-1 possesses a melt index of 0.44, a density of 0.9140, a yield strength of 2,300 p.s.i., a tensile strength of 4,635 p.s.i., and a low temperature brittleness of −15°C.

By adjusting the BU a series of tubes having various $M/T$ were produced. Each tube was tested for tear strength by ASTMD 1922–61T in the transverse and machine direction and on the crease. The crease was tested in the machine direction by notching in the crease. The data is reported below.

| Run | $M/T$ ratio | Tear Strength, grams/mil of Film Thickness Transverse | Machine | Crease |
|---|---|---|---|---|
| 1 | 0.58 | 350 | 820 | 920 |
| 2 | 0.77 | 520 | 660 | 550 |
| 3 | 0.78 | 480 | 690 | 666 |
| 4 | 0.79 | 440 | 680 | 640 |
| 5 | 0.99 | 560 | 600 | 370 |
| 6 | 1.30 | 620 | 440 | 43 |
| 7 | 1.79 | 610 | 390 | 75 |
| 8 | 2.50 | 770 | 70 | 43 |

Figure 3:
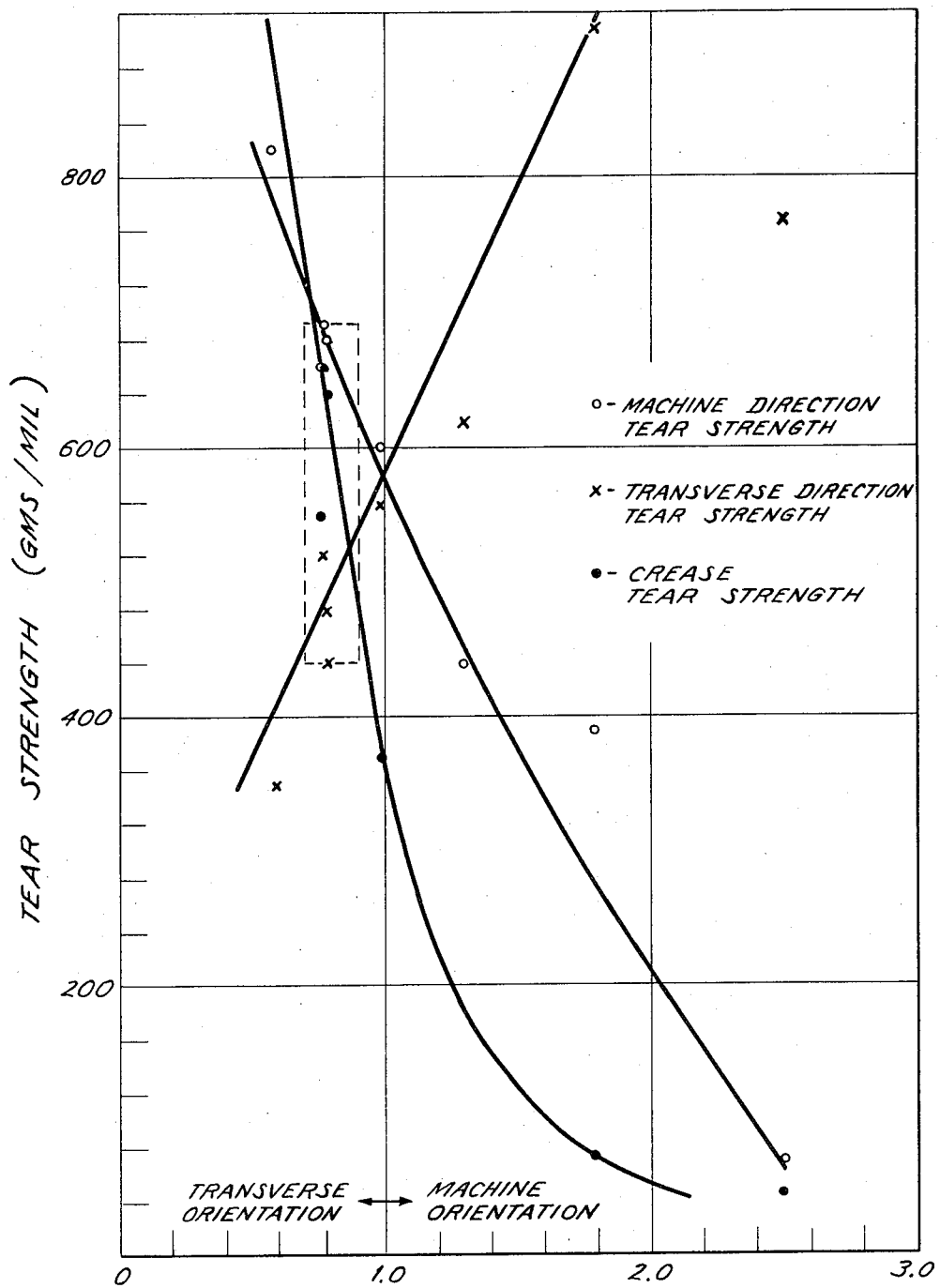
FIG. 3 is a graph plotting the ratio of machine direction orientation to the transverse direction orientation in regard to the tear strength determined by ASTM D 1922–61T for machine direction, transverse direction and crease. The crease is measured in the machine direction.

This data was used to plot FIG. 3 wherein the essential limitations in regard to the process and polybutene-1 of this invention can be more clearly seen. $M/T$ ratios of less than about 0.7 result in weak transverse direction tear strength. $M/T$ ratios above about 0.9 result in weaker machine direction tear strength and substantially weaker crease tear strength. It can be seen that the polybutene-1 tubing having an $M/T$ ratio in the range of about 0.7 to 0.9 did not have any tear strength less than about 460 grams/mil whereas the lowest tear strength in a balanced film, i.e., $M/T$ ratio = 1 can be observed to be about 390 grams/mil.

The invention claimed is:

1. Flexible, collapsible tubing comprising polybutene-1 produced by extruding a tube through a die, expanding said tube to a diameter greater than the diameter of said die and collapsing said tube to a lay flat condition thereby forming two creases running lengthwise of said tubing, said tubing having a ratio of machine direction orientation to transverse direction orientation as defined by the term $do/(BU)^2 t$, said ratio being in the range of from 0.7 to 0.9 wherein $do$ is the die opening, $BU$ is equal to the diameter of the expanded tube divided by the diameter of said die and $t$ is the thickness of the expanded tube with the further proviso that $t$ varies from about 10 to 30 mils and *BU varies from about 1 to 6.*

2. A flexible, collapsible tubing as claimed in claim 1 wherein *BU* varies from 1 to 2.25.

* * * * *